United States Patent [19]

Stambaugh et al.

[11] 4,146,489

[45] Mar. 27, 1979

[54] POLYOLEFIN GRAFT COPOLYMERS

[75] Inventors: Robert L. Stambaugh, Hatboro; Richard A. Galluccio, Perkasie, both of Pa.

[73] Assignee: Rohm and Haas Company, Philadelphia, Pa.

[21] Appl. No.: 843,300

[22] Filed: Oct. 18, 1977

Related U.S. Application Data

[63] Continuation-in-part of Ser. No. 600,652, Jul. 31, 1975, abandoned.

[51] Int. Cl.$^2$ .................... C10M 1/32; C10M 3/26; C10L 1/14; C08L 23/00
[52] U.S. Cl. ......................................... 252/50; 44/62; 44/63; 252/51.5 A; 252/51.5 R; 260/878 R
[58] Field of Search .......... 44/62, 63; 252/50, 51.5 A, 252/51.5 R; 260/878 R

[56] References Cited

U.S. PATENT DOCUMENTS

| | | | |
|---|---|---|---|
| 2,838,456 | 6/1958 | Banes et al. | 252/50 |
| 2,901,458 | 8/1959 | Banes et al. | 252/50 |
| 3,089,832 | 5/1963 | Black et al. | 204/158 |
| 3,551,336 | 12/1970 | Jacobson et al. | 252/59 |
| 3,687,849 | 8/1972 | Abbott | 252/51.5 A |
| 3,929,800 | 12/1975 | Horowitz | 252/50 |
| 4,092,255 | 5/1978 | Chapelet et al. | 252/50 |

*Primary Examiner*—Delbert E. Gantz
*Assistant Examiner*—Irving Vaughn
*Attorney, Agent, or Firm*—Patrick C. Baker

[57] ABSTRACT

Graft copolymers wherein the backbone polymer is a rubbery, oil soluble ethylene-propylene copolymer or ethylene-propylene diene modified terpolymer and the graft monomer is a C-vinylpyridine or N-vinylpyrrolidone impart dispersant properties to hydrocarbon fuels and combined viscosity index improvement and dispersant properties to lubricating oils for internal combustion engines. The graft copolymers are prepared by intimate admixture of backbone polymer, graft monomer and free radical initiator at a temperature below initiation temperature, followed by a temperature increase to or above initiation temperature, thus providing a product containing little or no byproduct.

34 Claims, No Drawings

POLYOLEFIN GRAFT COPOLYMERS

RELATED APPLICATION

This application is a continuation-in-part of application Ser. No. 600,652 filed July 31, 1975 and abandoned as of the filing of this application.

BACKGROUND OF THE INVENTION

This invention relates to lubricating oils and hydrocarbon fuels containing graft copolymers which impart beneficial properties to these fluids, in particular improvements in dispersancy but also, in the case of lubricating oils, enhanced viscosity and viscosity/temperature relationships. The graft copolymers, when added to the oil, yield lubricants which are excellent dispersants for sludge formed in internal combustion engines, whether spark ignition or compression ignition. The invention further relates to the graft copolymers and methods of preparation.

All lubricants, whatever their service, are exposed to environments which tend to cause the fluid to become dirty with use. The contaminants may be either external in origin, as for example in automotive crankcases where sludge and varnish are formed from a complex reaction of partially burned gasoline and blowby gases, or internal via direct oxidative degradation of the lubricant itself. In either case these deposits, unless dispersed, will settle out of the lubricant causing plugging of filters or even sticking of moving parts where tight tolerances are involved.

A number of additives have been available for many years to attempt to combat this problem. The first used were metal-containing detergents such as alkaline earth sulfonates or phenates. Although these function satisfactorily, they can, once their function is exhausted, contribute to deposits themselves. Furthermore, in certain applications, such as automotive crankcase lubricants, oil that enters the combustion chamber can leave undesirable ash deposits after burning.

Ashless additives, such as polybutene-based succinimides or polyol esters, are superior in this respect and are widely used. They, however, perform only one of the several functions that is demanded of a lubricant. Lubricant additives are called upon not only to provide dispersancy, but also to assure good viscosity-temperature characteristics (to provide adequate flow at low temperatures but still good film thicknesses at high temperature), as well as pour point depressancy, oxidation inhibition, anti-rust and anti-wear properties.

Important performance and economic benefits can be achieved when more than one of these functions can be combined in a single additive. Polymethacrylates have long been known for their excellence in influencing viscosity-temperature characteristics of lubricants. Modifications of the methacrylates can be made to combine dispersancy and viscosity-temperature control in a class of additives commonly known as dispersant viscosity index improvers, of which N-vinylpyrrolidone-alkyl methacrylate copolymers are the prime example. In addition to performing these two functions, such products have the advantage of being ashless.

Recently, a new class of viscosity index improvers, polyolefins, has become available. Probably the best of these, the ethylene-propylene copolymers, have an important advantage over polymethacrylates in that they are far more efficient thickeners, thereby being effective at relatively low use levels. However, the polyolefins are single function additives and their chemical and physical characteristics are such that it has not been possible to incorporate dispersancy without resorting to elaborate, impractical means. In the past, olefinic copolymers have been prepared by (1) direct copolymerization of the monomers, (2) chemical modification of the polymer backbone, or (3) grafting to oxidized, degraded substrates. None of these techniques are needed or used in the present invention. Prior to the use of the special grafting techniques described herein, it has not been possible to prepare dispersant polyolefinic VI improvers without elaborate preparative schemes ("VI" means viscosity index). Accordingly, an object of this invention is to provide a simple and practical method of incorporating dispersancy into these polyolefinic materials, thus combining dispersancy with their unique thickening features.

The additives of the invention are also useful in fuels. In particular, gasoline and middle distillate fuels, such as home heating oils, diesel fuels and jet fuels, tend to deteriorate oxidatively upon standing and form gummy deposits. These deposits can foul screens, burners, or fuel injectors. In the case of gasoline, such gummy residues are deposited in the carburetor, making control of air-fuel ratio impossible. The products of this invention will disperse such deposits, thus preventing deterioration in fuel quality.

SUMMARY

In brief outline, the graft copolymers of the invention result from grafting into an oil-soluble, substantially linear, rubbery backbone polymer, polar nitrogencontaining monomers selected from C-vinylpyridines and N-vinylpyrrolidone. In another aspect of the invention, the graft copolymers are prepared by forming an intimate mixture of backbone polymer, graft monomer and free radical polymerization initiator at a temperature below the initiation temperature, and then raising the temperature of the mixture to or above the initiation temperature to thereby form the graft copolymer. In still another aspect of the invention, the graft copolymers impart detergency to lubricating oils and hydrocarbon fuels, and combined detergency-VI improvement in lubricating oils, at low concentrations, of the order of about 0.1 to about 5.0% by weight of the total lubricating oil or hydrocarbon fuel.

DETAILED DESCRIPTION

Illustrative of the present invention, in preparing the graft copolymer using 2-vinylpyridine and a rubbery ethylene/propylene copolymer as a polymeric backbone material, the ethylene-propylene copolymer is first dissolved in dichlorobenzene at a temperature that varies from about 90° C. to about 150° C. until a uniform mixture or solution of the ethylene/propylene copolymer is obtained, while stirring constantly. The temperature of the homogeneous solution or mixture is then lowered to about 80° C. whereupon 2-vinylpyridine is added to the mixture. A high temperature initiator, such as t-butylperbenzoate, which is the preferred initiator, is also added at 80° C. No decomposition of the initiator takes place at this temperature and the monomer, initiator, and rubber are stirred and mixed until a uniform solution of all of the components is obtained. Typically, the concentration of the ethylene-propylene copolymer in the solvent is about 20 to about 30% by weight. The concentration of the 2-vinylpyridine monomer is about 1 to about 15% by weight, and more preferably about 10% by weight, based on the ethylene-propylene copolymer. The concentration of the initiator is about ½% to about 2% by weight, and more preferably about 1%, based on the ethylene-propylene copolymer. Thereafter, the temperature is gradually raised to between about 120° and about 140° C. while stirring to activate the initiator. The temperature is maintained in this range for about 1 to 2 hours, at which time the reaction is virtually complete. The preferred temperature range for the overall reaction (initial admixture plus subsequent grafting) is about 80°-150° C. The finished graft copolymer typically contains about 1 to about 10% by weight of nitrogen-containing graft monomer, preferably about 2 to about 6% by weight, and more preferably about 3% by weight.

Formation of an intimate mixture of reactants prior to initiation is a key aspect of this invention. By carrying out the graft reaction in this way, the formation of homopolymer of the graft monomer, a highly undesirable by-product of most graft reactions, is virtually eliminated. Furthermore, the grafting efficiency, that is, the percentage of olefinic polymer into which the polar monomer has been incorporated, is maximized.

The polyolefinic substrates are oil-soluble, substantially linear and rubbery in nature; hence, they are sometimes referred to as rubbers. The suitable substrates are ethylene/propylene ("EP") copolymers and ethylene/propylene/diene modified ("EPDM") terpolymers, singly or in admixture. Minor amounts of other rubbery polyolefinic materials may be included in admixture with the EP or EPDM materials, such as hydrogenated styrene-butadiene and styrene-isoprene copolymers or atactic polypropylene. Other olefinic, oil-soluble substrates or substrates that can be rendered oil-soluble after grafting, such as low-density polyethylene, may also be used in minor amounts with the EP and EPDM polymers. By "minor amount" is meant less than 50% by weight of the backbone polymer charge, for example about 5-30% by weight of the charge.

The ethylene-propylene copolymers may have a wide range of ethylene-propylene ratios. Above about 80 mole percent ethylene, the copolymers are partially crystalline, thus losing their oil solubility and their utility as substrates for this invention. Preferably, the ethylene-propylene substrates contain about 50 to about 70 mole percent ethylene, have viscosity average molecular weights of about 10,000 to about 200,000 and $\overline{M}_w/\overline{M}_n$ of less than four. Lower propylene contents, higher molecular weights, and broader molecular weight distributions can be used but such copolymers lead to generally less efficient VI improvers.

The ethylene/propylene diene modified terpolymers are well known materials containing low levels (preferably less than 10% by weight) of a non-conjugated diene such as 1,4-hexadiene, dicyclopentadiene or ethylidenenorbornene. Maximum ethylene is determined by crystallinity (solubility) with the preferred range being about 45 to about 65 mole percent ethylene. Preferred viscosity average molecular weight is about 10,000 to about 200,000 with $\overline{M}_w/\overline{M}_n$ of less than eight. Substrates outside of these ranges can be used at some sacrifice in properties of the VI improver made therewith.

The foregoing polymeric substrates provide graft copolymers which are both superior dispersants and good viscosity index improvers. While polyolefinic substrates outside of these ranges can be used and will produce graft copolymers which are good dispersants, the products will be inferior as viscosity index improvers.

The preferred monomer which is grafted to the olefinic backbone is 2-vinylpyridine. However, N-vinyl pyrrolidone or other polar C-vinylpyridines may be used, such as 2-vinylpyridine, 4-vinylpyridine, and lower alkyl ($C_1$-$C_8$) substituted C-vinylpyridines, such as 2-methyl-5-vinylpyridine, 2-methyl-4-vinylpyridine, 2-vinyl-5-ethyl pyridine, and 2-vinyl-6-methylpyridine.

Other polar nitrogen containing grafting monomers may be used in minor amounts with N-vinyl pyrrolidone or the C-vinylpyridines. These include dimethylaminoethyl methacrylate or acrylate, vinylimidazole, N-vinylcarbazole, N-vinylsuccinimide, acrylonitrile, o-, m-, or p-aminostyrene, maleimide, N-vinyl oxazolidone, N,N-dimethylaminoethyl vinyl ether, ethyl 2-cyanoacrylate, vinyl acetonitrile, N-vinylphthalimide, and 2-vinylquinoline; a variety of acrylamides and methacrylamides such as N-[1,1-dimethyl-3-oxobutyl] acrylamide, N-[1,2-dimethyl-1-ethyl-3-oxobutyl] acrylamide, N-(1,3-diphenyl-1-methyl-3-oxopropyl)acrylamide, N-(1-methyl-1-phenyl-3-oxobutyl) methacrylamide, N,N-diethylaminoethyl acrylamide, and 2-hydroxyethyl acrylamide. A variety of N-vinylcaprolactams or their thio- analogs, other than or in addition to N-vinylpyrrolidone, may be used in minor amounts. These include N-vinylthiopyrrolidone, 3-methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, 4,5-dimethyl-1-vinylpyrrolidone, 5,5-dimethyl-1-vinylpyrrolidone, 3,3,5-trimethyl-1-vinylpyrrolidone, 4-ethyl-1-vinylpyrrolidone, 5-methyl-5-ethyl-1-vinylpyrrolidone, 3,4,5-trimethyl-3-ethyl-1-vinylpyrrolidone, and other lower alkyl substituted N-vinylpyrrolidones; N-vinylbenzyldimethylamine, N-dimethylaminopropyl acrylamide and methacrylamide, N-methacryloxyethylpyrrolidone, N-methacryloxyethylmorpholinone, N-methacryloxyethylmorpholine, N-maleimide of dimethylaminopropylamine, and the N-methacrylamide of aminoethylethyleneurea. "Minor amounts" of such graft monomers means less than 50% by weight of the monomer charge, for example about 10-30% by weight of the charge.

Any free radical source capable of hydrogen abstraction may be used as a catalyst (initiator) in the preparation. Examples are alkyl peroxy esters, alkyl peroxides, alkyl hydroperoxides, diacyl peroxides, and the like. While t-butyl perbenzoate is the preferred initiator, other examples which would be suitable include t-butyl peroctoate, di-t-butylperoxide, t-butyl-hydroperoxide, cumene hydroperoxide, or benzoyl peroxide. Any mixtures of such initiators may be used.

While the preferred temperature range for the grafting reaction is about 80° to about 150° C., it will be recognized by those skilled in the art that this is in part a function of the choice of initiator. The reaction may be run over a wide temperature range, for example, about 60° to about 250° C., as long as care is taken to choose an appropriate initiator. As indicated above, the initiator and temperature choices should be such that radicals are not produced during formation of the intimate mixture of reactants but only after the temperature of the reaction mixture is increased.

During the grafting reaction any aliphatic or aromatic hydrocarbon including mineral oil may be used as the solvent medium for the preparation of the graft copolymer as long as the components are soluble in the solvent medium. However, halogenated aromatic hydrocarbons such as chlorobenzene and dichlorobenzene are preferred solvents. Dichlorobenzene is the most preferred solvent. The reaction may be run without solvent if the substrate polymers have sufficiently low melt viscosities at the grafting temperature.

It is known that when polymeric viscosity index improvers are subjected to the severe mechanical stresses of operating equipment, the polymers may be degraded, thus diminishing the favorable influence which such additives exert on viscosity-temperature and/or detergent properties of a lubricant or motor fuel. Polymers which resist this tendency to degrade mechanically in service are said to have shear stability. The ability of viscosity index improvers to resist mechanical degradation with use is dependent on a number of factors, one of which is molecular weight. A very high molecular weight polymer, although initially imparting highly effective control of viscosity-temperature properties, will be very substantially degraded in service and thus lose much or even nearly all of its effect.

The graft copolymers prepared by the process of this invention may be too high in molecular weight to be usable even though they are good VI improvers; that is, they may have poor shear stability. As indicated above, this derives in part from the technology and manufacturing process which are employed in the rubber industry, in particular by makers of ethylenepropylene copolymers and terpolymers. Such polymers are routinely made at very high molecular weight so that the products will be relatively hard solids and therefore more easily handled and transported. When these rubbers are prepared in molecular weights appropriate for use as VI improvers, the polymers are very sticky solids, which flow or "creep" even at ambient temperatures. Although technology is available to process these polymers to lower molecular weights as in the oxidative degradation processes of U.S. Pat. Nos. 3,404,091 and 3,687,849, special handling is required and the processing is slower, resulting in higher costs. Hence, when conventional ethylene-propylene rubbers are used in the process of this invention, the products are too high in molecular weight to provide acceptable shear stability.

Another factor adversely affecting the shear stability of the products of this invention is a result of an important aspect of the invention itself. During the grafting reaction, noticeable thickening takes place, and evaluation of the graft copolymer indicates that shear stability deteriorates during the grafting reaction. This very likely results from crosslinking that may occur as part of the reaction. Although it is possible to eliminate this crosslinking, the products so prepared generally are inferior dispersants. Hence, it appears to be inherent to some extent in the graft process of this invention that to obtain optimum dispersancy, some compromise in shear stability is necessary.

Means to bring the molecular weight down into the desirable range, that is, to where shear stability will be good, are readily available. It requires only mechanical or thermal degradation of the product subsequent to the grafting reaction to adjust the molecular weight to the preferred range. It is estimated that while the products of the grafting reaction may range upwards in viscosity average molecular weight to about 500,000 or more, the desired range for the final dispersant VI improver is about 20,000 to about 150,000, preferably about 30,000 to about 80,000, as determined by gel permeation chromatography (GPC).

Those skilled in the art will recognize that the molecular weights set forth throughout this specification are relative to the methods by which they are determined, often including a standard of comparison. For example, molecular weights determined by GPC and molecular weights calculated by comparing shear viscosity with a standard (such as a methacrylate polymer), may give different results. The petroleum additive chemist is not interested in molecular weights per se but rather in the handling characteristics and performance of a polymeric material and its derivatives, for example, whether it is a solid or a liquid, whether it is oil and/or hydrocarbon fuel soluble, and whether it has sufficient shear stability and thickening power under use conditions. Generally, shear stability is inversely proportional to molecular weight (viscosity average). As a result, the use of a high shear stable polymer usually will require more polymer to obtain good thickening (viscosity) and VI improvement. This increases the cost of treating lubricating oils to obtain these viscosity improvements. Accordingly, a fully effective polymer requires attention to balancing shear stability, molecular weight and treatment cost. The polymeric additives of the invention permit convenient tuning of these parameters since the final shear stability can be adjusted by post-degrading of the products to obtain the requisite balance of thickening ability and shear stability. Nevertheless, a surprising and unexpected benefit of the invention (see data of Table II below) is that substantially less of the products of the invention are required for equivalent thickening and shear stability as compared with known ethylene-propylene VI improvers. Moreover, these known VI improvers are non-dispersant whereas the products of the invention provide dispersancy as an additional benefit.

Any convenient means of degradation, such as in a gear pump or extruder is acceptable but homogenization is preferred. In a homogenization process the polymer is forced at high pressure through a device which utilizes variously designed throttle valves and narrow orifices. Such a device can generate shear rates of about 5000 sec.$^{-1}$ and more preferably of between about 10,000 and about 1,000,000 sec.$^{-1}$. Commercial devices such as that from the Manton-Gaulin Manufacturing Company or modifications thereof may be employed. Such equipment may be operated at pressures of up to about 20,000 psi to generate the necessary shear stress. The homogenization process may be employed in either a batch or continuous mode, depending on the degree of degradation desired.

An additional benefit of homogenization is that the products of this invention become even more efficient thickeners than the commercially available non-dispersant ethylene-propylene copolymers. Hence, the products of this invention, when homogenization is also used, possess not only superior dispersancy characteristics but also an outstanding thickening ability/shear stability balance.

The products of this invention may be used in a wide variety of fuels and lubricants. They are primarily of utility in lubricants, where both their superior dispersancy and their influence on viscosity-temperature control are of value. Appropriate lubricant base stocks include oils of both mineral (petroleum) and synthetic origin. The oils may vary in viscosity from spindle oils to motor oils to gear oils. Suitable synthetic fluids include esters such as dialkyl adipate, dialkyl sebacate, or dialkyl azelate, triesters of trimethylolpropane, tetraesters of pentaerythritol, polyalkyleneglycol esters, phosphate esters, or synthesized hydrocarbons of the poly-α-olefin or alkylbenzene types. Typical applications include hydraulic fluids, automatic transmission fluids, automotive crankcase oils, gear oils, and greases.

The products of this invention may be used in lubricants at about 0.1% to about 5.0% by weight, preferably about 0.3-2.0% by weight, but more typically at about 0.6% to about 1.5%. As these products are rubbery solids, they are routinely manufactured as viscous concentrates at about 7 to about 15% solids in oil, and the commercial user would accordingly use an amount of the concentrate giving the above recited range of polymeric ingredient.

The lubricants containing the products of this invention may also include other additives to provide additional dispersancy, viscosity-temperature control, pour point depressancy, high temperature detergency, rust inhibition, anti-wear agents, antioxidants, extreme pressure agents, friction modifiers, anti-foam agents or dyes. Accordingly, there may be used with the products of this invention polybutene-based succinimides or esters, phosphosulfurized polybutenes, polyacrylates or polymethacrylates, polyisobutylene, ethylene-propylene copolymers or terpolymers, hydrogenated styrene-butadiene or styrene-isoprene, N-vinyl-pyrrolidone- or dimethylaminoethyl methacrylate-containing copolymers with methacrylates, styrene polyesters, ethylene-vinyl acetate copolymers or oligomers, dialkyl fumarate polymers or copolymers, esterified styrene-maleic anhydride copolymers or oligomers, hydrocarbon wax-naphthalene condensates of the Friedel-Crafts type, chlorinated hydrocarbons, alkaline earth sulfonates, phenates, salicylates or phenate sulfides, alkaline earth alkylnaphthalene sulfonates, zinc or other metallic dialkyldithiophosphates or diaryldithiophosphates, zinc, cadmium, lead, molybdenum, or other metallic dithiocarbamates, sulfurized or phosphosulfurized esters or terpenes, hindered phenols, phenothiazine or alkylated phenothiazines, naphthylamines, phenylenediamines, dibenzyl disulfide, sulfurized diisobutylene or tri-isobutylene, trialkyl or triaryl phosphites, tricresyl phosphate or silicone polymers, and the like.

When the products of this invention are used in hydrocarbon motor fuels, where primary use is made of their superior dispersancy, generally lower levels will be used, typically about 0.001% to about 0.1% by weight. The fuels include both gasoline and diesel types, and may also contain other additives such as antioxidants, metal deactivators, stabilizers, anti-rust agents, injector detergents, induction system deposit control additives or other carburetor detergents.

Throughout this specification and the following illustrative examples, all parts and percentages are by weight, unless otherwise stated. The detergency test data are based on the following test procedures:

DISPERSANCY TEST PROCEDURES

A. Asphaltenes Test

A method for determining the dispersing activity of any given polymer is based on the capacity of the polymer to disperse asphaltenes in a typical mineral oil. The asphaltenes are obtained by oxidizing a naphthenic oil with air under the influence of a trace of iron salt as catalyst, such as ferric naphthenate. The oxidation is desirably accomplished at 175° C. for approximately 72 hours by passing a stream of air through a naphthenic oil to form a sludge which may be separated by centrifuging. The sludge is freed from oil (extracting it with pentane). It is then taken up with chloroform and the resulting solution is adjusted to a solids content of about 2% (weight by volume).

When a polymer is to be examined for its dispersing activity, it is dissolved in a standard oil, such as a solvent-extracted 100 neutral oil. Blends may be prepared to contain percentages varying from about 2% to about 0.01% or even lower of polymer in oil.

A 10 ml. sample of a blend is treated with 2 ml. of the standard solution of asphaltenes in chloroform. The sample and reagent are thoroughly mixed in a test tube and the tube is placed in a forced draft oven at either 90° C. or 150° C. for two hours to drive off volatile material. The tube is then allowed to cool and the appearance of the sample is noted.

If the polymer has dispersing activity, the oil will appear clear although colored. Experience has demonstrated that, unless a polymer exhibits dispersing activity, at concentrations below about 2% in the above test, it will fail to improve the cleanliness of engine parts in actual engine tests.

b. Sequence V-C Test

The sequence V-C Test is an engine test procedure that evaluates crankcase motor oil with respect to sludge and varnish deposits produced by engine operation under a combination of low and midrange temperatures. This test also indicates a capacity of the oil to keep positive crankcase ventilation (PCV) valves clean and functioning properly. Following is a summary of the test.

This test uses a 302 C.I.D., V-8 "Sequence V-C Oil Test Engine and Parts Kit" obtained from Ford Motor Company. The test engine is completely disassembled, cleaned and rebuilt in a specified manner. It is then installed on a dynamometer test stand equipped with appropriate accessories for controlling speed, load and other conditions. It is operated with certified MS-08 fuel in three stages. During stage 1, the engine is operated for 120 minutes at high power output with moderate oil and water temperatures and a lean air/fuel ratio (A/F). Stage 2 operates for an additional 75 minutes at higher oil and water temperatures. During stage 3, the engine is operated for 45 minutes at low RPM with low oil and water temperatures and with a rich A/F. Four cycles each of four hours duration are run each day until 48 cycles (192 engine operating hours) are accumulated.

At the conclusion of the test, the engine is completely disassembled to determine the extent of wear, sludge, varnish, and valve deposits. In addition, clogging of the PCV valve, oil rings and oil screen are determined. The test evaluates the sludge dispersant characteristics of a lubricant under low and medium temperature operating conditions. The test engine is operated under conditions described in ASTM Special Technical Publication No. 315F published by the American Society of Testing Materials, 1916 Race Street, Philadelphia, Pa., 19103.

EXAMPLE 1

A. Preparation of a 2-Vinylpyridine to Ethylene/Propylene Graft Copolymer

O-Dichlorobenzene, 675 g., was added to a clean, nitrogen flushed 5 l. flask and heated to 100° C. under nitrogen. A sample of a 60/40 mol. % ethylene/propylene copolymer was cut into small pieces and added to the solvent. A total of 225 g. of the hydrocarbon polymer was added to the dichlorobenzene. After a homogeneous solution was obtained, the contents of the flask were cooled to 80° C. and 22.5 g. of commercially available 2-vinylpyridine was added to the flask. When mixing was complete, 1.32 g. of 85% t-butyl perbenzoate was added to the flask. The temperature was held at 80° C. for one-half hour to complete mixing and then raised to 140° C. over a one-half hour period. After a 40 minute holding period an additional 1.32 g. of perester was added. The solution was held at 140° C. for one hour and then 1720 g. of 100 neutral solvent refined mineral oil was added. The product solution was then vacuum stripped of solvent and unreacted monomer with final conditions of 0.5 mm Hg. and 150° C. being held for one hour. The product was then further diluted with 305 g. of 100 neutral oil, producing a concentrate containing 10.4% graft copolymer.

A sample of the graft copolymer was isolated by dialysis and found to contain 0.41% nitrogen by Kjeldahl analysis. The titratable nitrogen content was found to be 0.40%.

B. Blending Data

A crankcase oil blend was prepared using the formulation shown below:

Formulation B 8.10% of the oil concentrate of the graft copolymer product of A above
0.50% pour point depressant
2.00% polybutene succinimide ashless dispersant
2.00% overbased magnesium sulfonate (400 TBN)
1.50% zinc dialkyldithiophosphate
38.65% 100 neutral oil
47.24% 200 neutral oil
0.01% silicone antifoam solution The viscometric properties of the above blend are compared below with those of the additive-treated base stock without VI improver and demonstrate that the graft copolymer of A can be used to formulate a quality 10W40 crankcase oil.

|  | Polymer Treated Blend (Formulation B) | Base oil plus all additives except graft copolymer |
|---|---|---|
| cSt., 350° F. | 4.18 | 1.89 |
| cSt., 210° F. | 15.03 | 5.84 |
| cSt., 100° F. | 110.04 | 36.98 |
| poise, 0° F. | 20.8 | 16.1 |
| VI (ASTM D-2270-74) | 152 | 110 |

C. Dispersancy Tests

1. Asphaltenes Test

In the standard asphaltenes test, 0.0625% of the graft copolymer of A dispersed 0.4% of asphaltenes at 150° C. The starting ethylene/propylene copolymer will not disperse asphaltenes even at 2.0% polymer concentration.

2. Sequence V-C Test

A Sequence V-C test was also carried out on the formulation B (see part B above). The test results are given below along with the specifications required to meet the American Petroleum Institute's SE service classification. Also given are the test results on a poor 2-vinylpyridine to ethylene/propylene graft copolymer in the same additive package used for B (see column 2 below). This copolymer, prepared during an unsuccessful grafting experiment, contained only 0.08% Kjeldahl nitrogen and can be considered a base case. The third column shows results for a widely-used dispersant methacrylate copolymer. Note that the dispersancy activity of the graft copolymer of A used in Formulation B above is substantially superior to that of the commercial polymethacrylate even though graft copolymer A is used at only 25% of the treating level of the commercial product.

TABLE I

Sequence V-C Test Results, 192 hrs.

|  | Formulation B | Non-Dispersant Base Case | Commercial Polymethacrylate Dispersant | SE Spec |
|---|---|---|---|---|
| % Polymer | 0.84 | 0.96 | 3.3 | — |
| Avg. Sludge Rating[1] | 9.3 | 4.2 | 7.1 | 8.5, min. |
| Avg. Varnish Rating[1] | 8.4 | 7.8 | 7.9 | 8.0, min. |
| Piston Skirt Rating[1] Varnish | 8.2 | 7.5 | 7.4 | 7.9, min. |
| % Oil Ring Clogging | 0 | 0 | 0 | 5, max. |
| % Oil Screen Clogging | 0 | 0 | 0 | 5, max. |

[1]10 = clean

EXAMPLE 2

The oil concentrate of the graft copolymer A of Example 1 was homogenized at 8000 psi in a Model 15M-8TA laboratory size Manton-Gaulin Homogenizer. A portion of the graft copolymer A was withdrawn after a single pass (product designated 2A) while the remainder was recycled for two additional passes (product designated 2B). The asphaltenes dispersancy of the graft copolymer products was unchanged during homogenization.

Shear stability evaluation of the products was carried out by preparing typical 10W40 formulations. A 6.0 cSt. base oil was thickened to 15.0 cSt. at 210° F. The lubricants were degraded in a sonic oscillator as per the test method described in ASTM D-2603. From these results one is able to predict the viscosity degradation that will take place after 2000 miles of automotive crankcase service. Comparison of the shear stability of these homogenized products with that of commercial polymethacrylate and a commercial non-dispersant ethylene-propylene copolymer is shown below in Table II.

TABLE II

Shear Stability of Homogenized Graft Copolymers

|  | % Polymer to Thicken to 15.0 cSt. at 210° F. | Predicted Viscosity After 2000 Miles of Road Operation, cSt. at 210° F. |
| --- | --- | --- |
| Graft Copolymer of Example 1A | 0.84 | 12.1 |
| Commercial Polymethacrylate A | 3.10 | 12.1 |
| Graft Copolymer of Example 2A | 0.88 | 13.2 |
| Commercial Ethylene-Propylene | 1.27 | 13.2 |
| Commercial Polymethacrylate B | 3.40 | 13.2 |
| Graft Copolymer of Example 2B | 1.00 | 13.9 |
| Commercial Polymethacrylate B | 4.10 | 13.9 |

It will be noted that that the thickening efficiency of the graft copolymers is dramatically superior to that of commercial polymethacrylates. More importantly, the product 2A, prepared by homogenization, requires about 30% less polymer for equivalent thickening/shear stability than the commercial non-dispersant ethylene-propylene copolymer.

As ethylene-propylene copolymers do not naturally depress pour points as do some polymethacrylates and in fact in some cases actually interfere with the function of auxiliary pour point depressants, commercial utility dictates that it be demonstrated that good low temperature properties can be imparted to products of this invention. This is shown in Table III.

TABLE III

Low Temperature Properties of Pour-Depressed Graft Copolymers

| Base Oil[1] | Pour Depressant Identity (commercial) | Wt. % (in oil) | ASTM Pour Point, °F | Brookfield Visc., cP. at −20° F |
| --- | --- | --- | --- | --- |
| 1 | a | 1.0 | −40 | 42,250 |
| 2 | b | 0.5 | −40 | 42,250 |
| 3 | c | 0.5 | below −50 | 49,000 |
| 4 | a | 1.0 | −35 | 42,500 |
| 5 | a | 1.0 | −35 | 36,600 |

[1]All oils contain 1.1% (polymer basis) of the product of Example 2B, corresponding to the polymer level of a 10W50 formulation.

These data indicate that product 2B is completely acceptable for 10W50 automotive crankcase lubricants.

The viscosity average molecular weights ($\overline{M}_v$) of the ethylene-propylene (EP) graft copolymers set forth in Table II above can be calculated in a known manner from the shear stabilities (% polymer to thicken to 15.0 cSt. at 210° F.) given in the table. This is based on the widely accepted principle that the weight percent of polymer necessary to thicken an oil to a given viscosity varies inversely with the intrinsic viscosity of the polymer and also with the viscosity average molecular weight. The increased use level of polymer in going from product 1A to product 2A in Table II therefore shows that the polymer was degraded (molecular weight lowered). The degradation is also shown by the predicted viscosities after road operation set forth in Table II since it is well known that polymer-thickened lubricants undergo viscosity losses as a result of mechanical polymer breakage during engine use, and low molecular weight polymers are more shear stable than high molecular weight counterparts. Accordingly, since product 1A in Table II degrades to 12.1 cSt. while 2A degrades to only 13.2 and 2B still less to 13.9, it is clear that 2B is lower in molecular weight than 2A and both are lower than that of the unhomogenized product 1A.

The molecular weights of the grafted products of Table II can be calculated as follows. Shear stability is often quantified as "Shear Stability Index" (SSI):

$$SSI = (\mu i - \mu f)/(\mu i - \mu o) \times 100$$

where $\mu_i$ = initial oil viscosity, cSt.

$\mu_f$ = final used oil viscosity, cSt.

$\mu_o$ = viscosity of base oil including all additives except VI improver, cSt.

Products 2A and 2B of Table II thus have SSI's of 20 and 12, respectively. In a typical polymethacrylate VI improver (for which molecular weights are known), the average monomer unit has a molecular weight of about 200. Of this, only one —CH$_2$—C— unit or 13% of the mass, is in the backbone. The remainder of the molecule contributes little or nothing to thickening and shear stability. In contrast, the graft copolymers of Table II with 70 mole % ethylene are nearly the ideal thickeners since 86% of their mass is in their backbones. Relative thickening efficiencies of various polymer types (at constant shear stability) may therefore be related to percent of molecular weight in the backbone.

Viscosity average molecular weight may then be estimated for any polymer by multiplying the polymethacrylate $\overline{M}_v$ by 13/% of backbone molecular for the unknown polymer. This factor for the graft copolymers of Table II is 13/86. Using the weight average molecular weight/SSI plot of FIG. 8 for polymethacrylates from the paper by R. L. Stambaugh and R. J. Kopko titled, "A Test Procedure For Evaluating Temporary-Shear Loss of Engine Lubricants", SAE Paper No. 750379, Feb. 24-28, 1975, and converting to $\overline{M}_v$ ($\overline{M}_v$ is about 80% of weight average molecular weight, $\overline{M}_w$), the viscosity average molecular weights of the EP polymers are as follows:

TABLE IV

Molecular Weights of Products of Table II

| Table II, Example | SSI | $\overline{M}_v$, PMMA | $\overline{M}_v$, EP |
| --- | --- | --- | --- |
| 1A - Starting polymer | — | 1,400,000* | 169,300 |
| 2A - After 1 pass | 20 | 890,000 | 107,600 |
| 2B - After 3 passes | 12 | 650,000 | 78,400 |

*By extrapolation, FIG. 8 plot of Stambaugh and Kopko paper identified above.

These estimates show the effect of the homogenization on polymer molecular weight, relative to viscosity loss and shear stability.

EXAMPLE 3

To a 500 ml. 3-necked flask equipped with a thermometer, a c-stirrer, a reflux condenser, and a N$_2$-inlet were added 120 g. of benzene. The benzene was heated to 80° C. and 30.0 g. of a 60/40 mol.% ethylene/propylene copolymer was added in the form of small chunks. Heating and stirring were continued until the polymer had dissolved (about 6 hrs.), then 3.0 g. of 2-vinylpyridine was added, and the solution temperature lowered to 60° C. At this point, the first addition of initiator solution in benzene, dicyclohexyperoxydicarbonate, 0.30 g., dissolved in 0.70 g. of benzene was made in the amount of 0.20 g. At 15 minute intervals, the remaining initiator solution was added in 0.20 g. amounts for a total of 5 catalyst additions over a 1 hr. period. The reaction mixture was heated for 4 hours more, then 170 g. of 100N oil added and the benzene removed by distillation at atmospheric pressure. Unreacted monomer and the other volatiles were removed by vacuum distillation at 0.5 mm Hg. at a pot temperature of 135° C. The resulting graft copolymer was able to disperse 0.4% asphaltenes at 150° C. when used at a concentration of 0.0625%. The nitrogen content of the pure polymer was 0.27%.

EXAMPLE 4

A five liter, 3 neck flask was equipped with a thermometer fitted via a flexible rubber mount attached to a ground glass adaptor, a c-type stirrer mounted in a ground glass adapter via a Teflon insert, and a "y" tube containing a pressure-equalized addition funnel and a water-jacketed condenser. Atop the condenser was fitted an inlet tube to provide a nitrogen atmosphere throughout the reaction. A Variac-controlled heating mantle was used as heat source.

To the reaction flask was added 337.5 grams of a solvent refined 100 neutral oil. The oil was heated with stirring to 120° C. followed by the gradual addition of 225.0 g. of an ethylene-propylene terpolymer of a 60 mol % ethylene and 40 mol % of propylene-diene containing 1 to 5% of diene on terpolymer. (Diene content may range from 1 to 10% but preferably is 1 to 5%). The mixture was heated for 5 hours at 140°-160° C. Upon completion of terpolymer solubilization, the temperature was reduced to 80° C. and 22.5 g. of 2-vinylpyridine was added during a period of 10 minutes. The solution was maintained at approximately 80° C. for 1.3 hours and then 1.31 g. of commercial t-butyl perbenzoate was injected into the reaction mixture. The solution was stirred for about 30 minutes at 80° C. followed by a fairly rapid heating of the solution to 130° C. When the temperature reached 130° C. an additional increment of t-butyl perbenzoate 1.31 g. was charged. The solution became more viscous with continued stirring at 140° C. for 50 minutes. The solution was then diluted to approximately 25% solids based on the polymer substrate and stirred for 3.3 hours at 120° to 140° C. The solution was stripped for unreacted 2-vinylpyridine at 1.5 mm Hg. at 130° to 140° C. for 30 minutes. Dilution oil was added to bring the final solids to 10.8% (determined by dialysis).

The graft polymeric product (graft terpolymer) was analyzed for nitrogen content by the Kjeldahl Method and by perchloric acid/acetic acid titration giving 0.53 and 0.57, respectively, corresponding to 4.0 and 4.3% 2-vinylpyridine in the polymer. A solution containing 0.0625% graft terpolymeric product completely dispersed 0.4% asphaltenes at 150° C. A base stock containing additives substantially the same as those shown in Formulation B having a viscosity of 6.21 cSt. at 210° F. and 38.84 cSt. at 100° F. required 1.46% pure graft polymeric product to give viscosities of 14.99 cSt. at 210° F. and 107.2 cSt. at 100° F.

EXAMPLE 5

To the reaction vessel described in Example 4 was added 250 g. of a 60/40 mol. % ethylene-propylene copolymer and 400 g. of solvent refined 100 neutral oil. The solution was heated with stirring to 175° to 200° C. to dissolve the polymer in the oil. Complete solution occurred in three hours. The temperature was decreased to 76° C. and 22.5 g. of 2-vinylpyridine was added over a ten minute period. The solution was stirred at 80° C. for one hour to mix in the 2-vinylpyridine. At the end of the hour 1.45 g. of t-butyl perbenzoate was added and the solution was stirred at 80° to 90° C. After 20 minutes the heat input was adjusted to increase the temperature to 140° C. Forty-five minutes later 125 ml. of 100 neutral oil was added to the solution. At a total reaction time of 2½ hours from the first addition of 2-vinylpyridine, another shot of t-butyl perbenzoate (1.45 g.) was made. Three minutes following this addition 135 ml. of 100 neutral oil was added to reduce the viscosity of the solution. Further additions of 100 neutral oil were made at three (380 ml.) and 3¼ hours (500 ml.). The solution was heated to 150° C. and held at this temperature for one-half hour and then the unreacted monomer was distilled from the solution with final conditions of 1.5 mm Hg. pressure and 150° C. temperature held for one-half hour. After the distillation the solution was diluted with 100 neutral oil to a final solids content of 8.5%.

The graft copolymer isolated by the dialysis was analyzed for basic nitrogen by titration with perchloric acid/acetic acid giving a value of 0.45 corresponding to an incorporation of 3.4% 2-vinylpyridine in the polymer. A solution containing 0.0625% graft copolymer completely dispersed 0.4% asphaltenes at 150° C. Addition of 0.90% pure graft copolymer to the base stock of Example 4 resulted in a solution having viscosities of 14.90 cSt. at 210° F. and 103.9 cSt. at 100° F.

EXAMPLE 6

To a 5-liter, three-necked flask equipped with stirrer, thermometer, addition funnel and condenser with attached adapter for maintaining a nitrogen atmosphere was charged 250 g. of a commercially available ethylene/propylene/diene terpolymer having an appropriate molecular weight for use as a viscosity index improver in motor oil. There was then added 297 g. of chlorobenzene and 141 g. of 100 neutral solvent refined oil. The mixture was heated to 140° C. and stirred for 4 hours during which time the rubber terpolymer dissolved and the mixture became homogeneous. The mixture was cooled to 80° to 90° C. and 25 g. of 2-vinylpyridine was added. Stirring was continued for 30 minutes to obtain a homogeneous mixture. A solution of 1.46 g. of commercially available 85% t-butyl perbenzoate in 13.1 g. of 100 neutral oil was added through the addition funnel over a 10 minute period and stirring was continued for another half-hour. The mixture was then heated to 140° C. over a half-hour interval and maintained at that temperature for another 30 minutes. Another solution of 1.46 g. of t-butyl perbenzoate in 13.1 g. of 100 neutral oil was added through the addition funnel during a 10 minute interval and then the stirred mixture was maintained at 140° C. for another 45 minutes.

There was added 1250 g. of 100 neutral oil and the mixture was stirred at 140° C. until it was homogeneous. The condenser was adapted for vacuum distillation and the pressure was slowly reduced to 1 to 2 mm. Hg. and then maintained there for one-half hour while 312 g. of a mixture of chlorobenzene and excess 2-vinylpyridine was distilled from the flask. Another 833 g. of 100 neutral oil was added to reduce the solids to about 10%. The mixture was then stirred until homogeneous.

The polymeric product solution (in oil) weighed 2510 g. and contained 10.6% solids as measured by dialysis. The dialyzed sample contained 0.34% nitrogen by titration, which corresponds to 2.6% of 2-vinylpyridine grafted to the substrate. In the asphaltenes test, 0.0625% of the pure graft copolymer dispersed 0.4% asphaltenes at 150° C. Treatment of the base stock of Example 4 with 14.3% of the polymeric product solution (about 10.6% in oil) of this example resulted in a fluid having viscosities of 15.08 cSt. at 210° F. and 109.57 cSt. at 100° F.

EXAMPLE 7

A graft of 2-vinylpyridine to an ethylene/propylene/diene terpolymer of a 60 mol. % ethylene and 40% propylene/diene containing a small amount of diene was carried out by the method of Example 1. The product was then homogenized to lower molecular weight as in Example 2 to give a viscosity index improver which, when added at a concentration of 1.40% polymer to an additive-treated base stock similar to that used in Example 4 having viscosities of 5.78 cSt. at 210° F. and 36.07 cSt. at 100° F., resulted in a finished oil whose viscosities at 210° F. and 100° F. were 15.21 cSt. and 117.65 cSt., respectively. The pure graft terpolymer contained 0.48% N by Kjeldahl analysis and 0.0625% of this material dispersed 0.4% asphaltenes at 150° C. A Sequence V-C engine test on the formulated oil containing 1.40% graft terpolymer and only 1.0% polybutene succinimide ashless dispersant gave the following results after 192 hours of operation.

| Sequence V-C Test Results, 192 hrs. | |
|---|---|
| Average Sludge | 8.1 |
| Average Varnish | 7.8 |
| Oil Ring Clogging, % | 3 |
| Oil Screen Clogging, % | 0 |

Comparison of these data with those of Table I indicates a high level of sludge dispersancy for this formulated product.

EXAMPLE 8

Example 1 was again repeated but 2-methyl-5-vinylpyridine was substituted for 2-vinylpyridine. The polymeric product isolated by dialysis contained 0.44% N as determined by titration with perchloric acid in an acetic acid/toluene mixed solvent system. Again, 0.0625% of pure graft copolymer dispersed 0.4% asphaltenes at 150° C. When the additive-treated base stock of Example 4 was treated with 0.75% of this graft copolymer, a fluid having viscosities of 15.09 cSt. at 210° F. and 118.08 cSt. at 100° F. resulted.

EXAMPLE 9

Chlorobenzene, 75 g., was heated to 130° in a 3-necked, 500 ml. round bottom flask equipped with stirrer, condenser, thermometer and nitrogen inlet and outlet. A 60/40 mol. % ethylenepropylene copolymer, 25 g., was added to the monochlorobenzene. When the solution appeared to be homogeneous, the temperature was brought to 120° C. and controlled at that temperature. t-Butyl peroctoate 0.25 g., was dissolved in 4 ml. of chlorobenzene. One ml. of this solution was added to the polymer solution. After six minutes, 2.5 gm. of N-vinylpyrrolidone was added over a two minute period. Three additional increments of initiator were added at twenty minute intervals. Three hours after the initial injection of initiator was made, 225 g. of 100 neutral solvent refined mineral oil was added to the flask. The product was then stripped of solvent and residual monomer with terminal conditions of 150° C. and 4 mm. Hg. pressure being held for thirty minutes. The base stock of Example 4 was thickened to 15.0 cSt. at 210° F. by 1.0% of this polymer; 0.25% of the graft copolymer dispersed 0.4% asphaltenes at 90° C.

EXAMPLE 10

The synthesis of Example 1 was repeated in all essential respects to give a graft copolymer effective as a dispersant-VI improver for a crankcase lubricating oil. The shear stability of the product was improved by homogenization as described in Example 2. Table V below summarizes the $\overline{M}_w$ and SSI values of the polymer as compared with those of the ethylene-propylene (EP) backbone starting polymer. It will be noted that the grafting increased the molecular weight but the molecular weight decreased as a result of the homogenization. The $\overline{M}_w$ determination was by conventional gel permeation chromatography using the following system:

Column: 4 ft. × 3/8 inch Styragel mixed bead consisting of equal parts of $10^3$Å, $10^4$Å, $10^5$Å, $10^6$Å and $10^7$Å beads.

Solvent: tetrahydrofuran (THF)

Flow rate: 1 ml./min.

Detector: Waters Assoc. R401 Differential Refractometer.

Sample Size: 1 ml. 0.25% solution in THF.

The column was calibrated with polystyrene standards obtained from Waters Associates. The polystyrene calibration was converted to an ethylene-propylene (EP) copolymer calibration curve using an EP copolymer sample from the B. F. Goodrich Company identified as "Epcar 506". $\overline{M}_w$ calculations were made in a conventional manner after correction of the chromatograms for axial dispersion. Viscosity average molecular weights are about 80% of the $\overline{M}_w$ values.

TABLE IV

| | Mw | SSI[1] | SSI[2] |
|---|---|---|---|
| EP Starting material | 142,000 | 18 | — |
| After Grafting (Ex. 10) | 189,000 | 44 | 57 |
| After homogenization: | | | |
| 1 pass | 166,000 | 31 | 46 |
| 2 passes | 157,000 | 22 | 30 |
| 3 passes | 121,000 | 7 | 9 |
| 4 passes | 96,000 | 6 | — |

[1] By 5 minute ultrasonic ASTM test D-2603
[2] By 10 hour L-38 engine test, ASTM Special Technical Pub. No. 509 (1972)

The following table summarizes the shear stability (SSI) requirements of graft copolymers of the invention for use in lubricating oils with respect to several popular grades. The data were calculated as described in Example 2 above and as further detailed in Technical Bulletin PC-41 of Rohm and Haas Company, April 1969, titled "Shear Stability Index - The Determination of Viscosity Loss of Multigraded Engine Oils." SSI requirements for other grades may be determined by the same test procedures and calculations. "D/I PKG." in column two of the table means the combination of dispersant, detergent and inhibitor conventionally present in lubricating oils, exclusive of the polymeric dispersant VI improver of the invention.

TABLE V

| | | MAXIMUM SSI FOR TYPICAL STAY-IN-GRADE SAE OILS | | |
|---|---|---|---|---|
| SAE GRADE | VISCOSITY, cSt., 210° F. BASE OIL + D/I PKG. | VISCOSITY RANGE FOR GRADE cSt., 210° F. | MAXIMUM VISCOSITY LOSS ALLOWABLE cSt., 210° F. | SSI (ROAD)[1] REQ'D. FOR STAY-IN-GRADE |
| 5W/30 | 4.5 | 9.6–12.9 | 3.3 | 39 |
| 10W/30 | 6.0 | 9.6–12.9 | 3.3 | 48 |
| 10W/40 | 6.0 | 12.9–16.8 | 3.9 | 36 |
| 15W/40 | 9.0 | 12.9–16.8 | 3.9 | 50 |
| 10W/50 | 6.0 | 16.8–22.7 | 5.9 | 35 |

[1] At 2000 miles road use test described in Rohm and Haas Company Technical Bulletin PC-41, supra.

We claim:

1. A lubricating oil containing a viscosity index improving and dispersant amount of a graft copolymer consisting essentially of an oil soluble, substantially linear, rubbery hydrocarbon backbone polymer selected from ethylene/propylene copolymer and ethylene/propylene diene modified terpolymer, said backbone polymer having graft polymerized thereon monomer units selected from C-vinylpyridines and N-vinylpyrrolidone.

2. The lubricating oil of claim 1 wherein the backbone polymer is ethylene/propylene copolymer and the graft monomer is 2-vinylpyridine.

3. The lubricating oil of claim 2 wherein the ethylene/propylene copolymer contains about 50–70 mole percent ethylene, and has a viscosity average molecular weight of at least 10,000 and a $\overline{M}_w/\overline{M}_v$ ratio of less than 4.

4. The lubricating oil of claim 1 wherein the backbone polymer is an ethylene/propylene diene modified terpolymer and the graft monomer is 2-vinylpyridine.

5. The lubricating oil of claim 4 wherein the terpolymer contains about 1–10% by weight of diene, and the terpolymer has a viscosity average molecular weight of at least 10,000 and a $\overline{M}_w/\overline{M}_v$ ratio of less than 8.

6. The lubricating oil of claim 1 wherein the backbone polymer is ethylene/propylene copolymer and the graft monomer is N-vinylpyrrolidone.

7. The lubricating oil of claim 1 wherein the backbone polymer is ethylene/propylene copolymer and the graft monomer is 2-methyl-5-vinylpyridine.

8. The lubricating oil as in claim 1 wherein the graft copolymer is prepared by intimately admixing backbone polymer, graft monomer and a free radical initiator capable of hydrogen abstraction at a temperature below the decomposition temperature of the initiator, and raising the temperature of the reaction mixture to or above said decomposition temperature.

9. The lubricating oil of claim 2 wherein the graft copolymer is prepared by intimately admixing backbone polymer, graft monomer and a free radical initiator capable of hydrogen abstraction at a temperature below the decomposition temperature of the initiator, and raising the temperature of the reaction mixture to or above said decomposition temperature.

10. The lubricating oil of claim 4 wherein the graft copolymer is prepared by intimately admixing backbone polymer, graft monomer and a free radical initiator capable of hydrogen abstraction at a temperature below the decomposition temperature of the initiator, and raising the temperature of the reaction mixture to or above said decomposition temperature.

11. The lubricating oil of claim 6 wherein the graft copolymer is prepared by intimately admixing backbone polymer, graft monomer and a free radical initiator capable of hydrogen abstraction at a temperature below the decomposition temperature of the initiator, and raising the temperature of the reaction mixture to or above said decomposition temperature.

12. A hydrocarbon fuel containing a dispersant amount of a graft copolymer consisting essentially of an oil soluble, substantially linear, rubbery hydrocarbon backbone polymer selected from ethylene/propylene copolymer and ethylene/propylene diene modified terpolymer, said backbone polymer having graft polymerized thereon graft monomer units selected from C-vinylpyridines and N-vinylpyrrolidone.

13. The hydrocarbon fuel of claim 12 wherein the backbone polymer is ethylene/propylene copolymer and the graft monomer is 2-vinylpyridine.

14. The hydrocarbon fuel of claim 12 wherein the backbone polymer is an ethylene/propylene diene modified terpolymer and the graft monomer is 2-vinylpyridine.

15. The hydrocarbon fuel of claim 12 wherein the backbone polymer is ethylene/propylene copolymer and the graft monomer is N-vinylpyrrolidone.

16. The hydrocarbon fuel of claim 12 wherein the graft copolymer is prepared by intimately admixing backbone polymer, graft monomer and a free radical initiator capable of hydrogen abstraction at a temperature below the decomposition temperature of the initiator, and raising the temperature of the reaction mixture to or above said decomposition temperature.

17. A process for preparing a graft copolymer, comprising intimately admixing (a) an oil soluble, substantially linear, rubbery hydrocarbon backbone polymer selected from ethylene/propylene copolymer and ethylene/propylene copolymer diene modified terpolymer, (b) graft monomer selected from C-vinylpyridines and N-vinylpyrrolidone, and (c) a free radical initiator capable of hydrogen abstraction, said admixing being effected at a temperature below the decomposition temperature of the initiator, and raising the temperature of the reaction mixture to or above said decomposition temperature.

18. The process of claim 17 wherein prior to said intimate admixing the backbone polymer and graft monomer are admixed and dissolved in a solvent, and the initiator is thereafter added to the resulting solution.

19. The process of claim 18 wherein the backbone polymer is ethylene-propylene copolymer or ethylene/propylene diene-modified terpolymer, the solvent is o-dichlorobenzene or chlorobenzene, the temperature of dissolution of backbone polymer and graft monomer in said solvent is 80° to 150° C., the graft monomer is 2-vinylpyridine, the initiator is t-butyl perbenzoate, and the temperature of the reaction mixture after addition of the initiator is raised to 120° to 140° C.

20. The process of claim 18 wherein the solvent is mineral oil.

21. The process of claim 17 further including degrading the resulting graft copolymer to a molecular weight effective to improve the shear stability thereof.

22. The graft copolymer prepared by the process of claim 17.

23. The graft copolymer prepared by the process of claim 18.

24. The graft copolymer prepared by the process of claim 19.

25. The graft copolymer prepared by the process of claim 21.

26. The process of claim 17 wherein the graft monomer is a C-vinylpyridine.

27. The process of claim 26 wherein the graft monomer is 2-vinylpyridine.

28. A graft copolymer effective for imparting dispersant properties to hydrocarbon fuels and both dispersancy and viscosity index improvement to lubricating oils, said graft copolymer consisting essentially of an oil soluble, substantially linear, rubbery hydrocarbon backbone polymer selected from ethylene/propylene copolymer and ethylene/propylene diene modified terpolymer, said backbone polymer having graft polymerized thereon monomer units selected from C-vinyl-pyridines and N-vinylpyrrolidone.

29. The graft copolymer of claim 28 wherein the backbone polymer is ethylene/propylene copolymer and the graft monomer is 2-vinylpyridine.

30. The graft copolymer of claim 29 wherein the ethylene/propylene copolymer contains about 50-70 mole percent ethylene, and has a viscosity average molecular weight of at least 10,000 and a $\overline{M}_w/\overline{M}_v$ ratio of less than 4.

31. The graft copolymer of claim 28 wherein the backbone polymer is an ethylene/propylene diene modified terpolymer and the graft monomer is 2-vinylpyridine.

32. The graft copolymer of claim 31 wherein the terpolymer contains about 1-10% by weight of diene, and the terpolymer has a viscosity average molecular weight of at least 10,000 and a $\overline{M}_w/\overline{M}_v$ ratio of less than 8.

33. The graft copolymer of claim 28 wherein the backbone polymer is ethylene/propylene copolymer and the graft monomer is N-vinylpyrrolidone.

34. The graft copolymer of claim 28 wherein the backbone polymer is ethylene/propylene copolymer and the graft monomer is 2-methyl-5-vinylpyridine.

* * * * *

UNITED STATES PATENT AND TRADEMARK OFFICE
CERTIFICATE OF CORRECTION

PATENT NO. : 4,146,489
DATED : March 27, 1979
INVENTOR(S) : Robert L. Stambaugh and Richard A Galluccio It is certified that error appears in the above-identified patent and that said Letters Patent are hereby corrected as shown below:

Column 2, line 31 - word "into" should read -- onto --.

Column 2, line 32 - should be a space between word "nitrogen" and hyphenated word "con-taining" at end of line.

Column 2, line 60- letter "t" should be underlined beford word "butyl-perbenzoate".

Column 4, lines 49, 50 and 51 - small letter "t" should be underlined on lines.

Column 8, line 67, Example 1- capital "O" should be underlined.

Column 9, line 8 - "t" should be underlined before word "butyl".

Column 11, line 42 , footnote 1, 3rd occurrence, "of" read -- in --

Column 13, line 6 - word "dicyclohexyperoxydicarbonate" should read -- dicyclohexylperoxydicarbonate --.

Column 13, lines 44 and 49 - letter "t" before word "butyl" should be underlined on both lines.

UNITED STATES PATENT AND TRADEMARK OFFICE
CERTIFICATE OF CORRECTION

PATENT NO. : 4,146,489  
DATED : March 27, 1979  
INVENTOR(S) : Robert L. Stambaugh and Richard A Galluccio It is certified that error appears in the above-identified patent and that said Letters Patent are hereby corrected as shown below:

<u>Column 13, line 54</u> - word "for" after word "stripped" should read -- of --.

<u>Column 14, lines 12, 18, 55, and 61</u> - "t" before word "butyl" should be underlined on each line.

<u>Column 15, line 68</u> - letter "t" before word "butyl" should be underlined.

Signed and Sealed this

Twenty-first Day of August 1979

[SEAL]

Attest:

LUTRELLE F. PARKER
*Attesting Officer*   *Acting Commissioner of Patents and Trademarks*

UNITED STATES PATENT AND TRADEMARK OFFICE
CERTIFICATE OF CORRECTION

PATENT NO. : 4,146,489

DATED : March 27, 1979

INVENTOR(S) : Robert L. Stambaugh
Richard A. Galluccio

It is certified that error appears in the above-identified patent and that said Letters Patent are hereby corrected as shown below:

Col. 17, lines 29 and 37 and col. 20, lines 9 and 18,

"$\overline{M}w/\overline{M}y$" should read -- $\overline{M}w/\overline{M}n$ --.

Signed and Sealed this

Ninth Day of December 1980

[SEAL]

Attest:

SIDNEY A. DIAMOND

Attesting Officer — Commissioner of Patents and Trademarks

REEXAMINATION CERTIFICATE (133rd)
United States Patent [19]

Stambaugh et al.

[11] B1 4,146,489

[45] Certificate Issued  Nov. 8, 1983

[54] POLYOLEFIN GRAFT COPOLYMERS AND LUBRICATING OILS AND FUELS CONTAINING SAME

[75] Inventors: Robert L. Stambaugh, Hatboro; Richard A. Galluccio, Perkasie, both of Pa.

[73] Assignee: Rohm and Haas Company, Philadelphia, Pa.

Reexamination Request:
No. 90/000,220, Jun. 23, 1982

Reexamination Certificate for:
Patent No.: 4,146,489
Issued: Mar. 27, 1979
Appl. No.: 843,300
Filed: Oct. 18, 1977

Certificate of Correction issued Aug. 11, 1979.

Certificate of Correction issued Dec. 9, 1980.

Related U.S. Application Data

[63] Continuation-in-part of Ser. No. 600,652, Jul. 31, 1975, abandoned.

[51] Int. Cl.$^3$ .................. C10M 1/32; C10M 3/26; C10L 1/14; C10L 1/22; C08F 271/02
[52] U.S. Cl. ................................. 252/50; 44/62; 44/63; 252/51.5 A; 252/51.5 R; 525/279
[58] Field of Search ............. 252/50, 51.5 A; 44/62, 44/63; 525/279

[56] References Cited

U.S. PATENT DOCUMENTS

| | | | |
|---|---|---|---|
| 2,838,456 | 6/1958 | Banes et al. | 252/50 |
| 2,901,458 | 8/1959 | Banes et al. | 252/50 X |
| 2,991,528 | 7/1961 | Haward et al. | 525/279 X |
| 3,067,163 | 12/1962 | Bauer | 260/45.5 |
| 3,076,792 | 2/1963 | Hollyday et al. | 260/78.5 |
| 3,089,832 | 5/1963 | Black et al. | 525/279 X |
| 3,255,130 | 6/1966 | Keim et al. | 260/8 |
| 3,423,381 | 1/1969 | Merijan et al. | 44/63 X |
| 3,449,249 | 6/1969 | Anderson | 252/51.5 A |
| 3,462,249 | 8/1969 | Tunkel | 44/63 X |
| 3,484,857 | 12/1969 | Anderson | 252/51.5 A X |
| 3,506,574 | 4/1970 | Stambaugh et al. | 252/51.5 R |
| 3,598,738 | 8/1971 | Biswell et al. | 252/59 |
| 3,644,582 | 2/1972 | Knaack | 525/279 X |
| 3,728,417 | 4/1973 | Knaack | 260/878 |
| 4,068,058 | 1/1978 | Engel et al. | 252/51.5 A |

FOREIGN PATENT DOCUMENTS

| | | |
|---|---|---|
| 836550 | 4/1976 | Belgium . |
| 578721 | 7/1958 | Italy . |
| 825680 | 12/1959 | United Kingdom . |
| 963771 | 3/1962 | United Kingdom . |
| 950315 | 2/1964 | United Kingdom . |
| 955258 | 4/1964 | United Kingdom . |

OTHER PUBLICATIONS

Fettes, E. M. (Editor), "Chemical Reactions of Polymers", 1969, pp. 849–853.

Casale, A., et al, "Polymer Stress Reactions", Vol. 1, pp. 162–167, 217, 218, 246 and 247, 1978.

*Primary Examiner*—Andrew H. Metz

[57] ABSTRACT

Graft copolymers wherein the backbone polymer is a rubbery, oil soluble ethylene-propylene copolymer or ethylene-propylene diene modified terpolymer and the graft monomer is a C-vinylpyridine or N-vinylpyrrolidone impart dispersant properties to hydrocarbon fuels and combined viscosity index improvement and dispersant properties to lubricating oils for internal combustion engines. The graft copolymers are prepared by intimate admixture of backbone polymer, graft monomer and free radical initiator at a temperature below initiation temperature, followed by a temperature increase to or above initiation temperature, thus providing a product containing little or no byproduct.

REEXAMINATION CERTIFICATE ISSUED UNDER 35 U.S.C. 307.

POLYOLEFIN GRAFT COPOLYMERS AND LUBRICATING OILS AND FUELS CONTAINING SAME

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 12, 17, 22-25, and 28 are determined to be patentable as amended:

Claims 2-11, 13-16, 18-21, 26, 27, and 29-34, dependent on amended claims, are determined to be patentable.

1. A lubricating oil containing a viscosity index improving and dispersant amount of a *chemically induced, free radical initiated* graft copolymer consisting essentially of an oil soluble, substantially linear, rubbery hydrocarbon backbone polymer selected from ethylene/propylene copolymer and ethylene/propylene diene modified terpolymer, said backbone polymer having graft polymerized thereon monomer units selected from C-vinylpyridines and N-vinylpyrrolidone.

12. A hydrocarbon fuel containing a dispersant amount of a *chemically induced, free radical initiated* graft copolymer consisting essentially of an oil soluble, substantially linear, rubbery hydrocarbon backbone polymer selected from ethylene/propylene copolymer and ethylene/propylene diene modified terpolymer, said backbone polymer having polymerized thereon graft monomer units selected from C-vinylpyridines and N-vinylpyrrolidone.

17. A process for preparing a *chemically induced, free radical initiated* graft copolymer, comprising intimately admixing (a) an oil soluble, substantially linear, rubbery hydrocarbon backbone polymer selected from ethylene/propylene copolymer and ethylene/propylene copolymer diene modified terpolymer, (b) graft monomer selected from C-vinylpyridines and N-vinylpyrrolidone, and (c) a free radical initiator capable of hydrogen abstraction, said admixing being effected at a temperature below the decomposition temperature of the initiator, and raising the temperature of the reaction mixture to or above said decomposition temperature.

22. The *chemically induced, free radical initiated* graft copolymer prepared by the process of claim 17.

23. The *chemically induced, free radical initiated* graft copolymer prepared by the process of claim 18.

24. The *chemically induced, free radical initiated* graft copolymer prepared by the process of claim 19.

25. The *chemically induced, free radical initiated* graft copolymer prepared by the process of claim 21.

28. A *chemically induced, free radical initiated* graft copolymer effective for imparting dispersant properties to hydrocarbon fuels and both dispersancy and viscosity index improvement to lubricating oils, said graft copolymer consisting essentially of an oil soluble, substantially linear, rubbery hydrocarbon backbone polymer selected from ethylene/propylene copolymer and ethylene/propylene diene modified terpolymer, said backbone polymer having graft polymerized thereon monomer units selected from C-vinylpyridines and N-vinylpyrrolidone.

* * * * *